(12) United States Patent
Kundtz et al.

(10) Patent No.: US 7,209,895 B2
(45) Date of Patent: Apr. 24, 2007

(54) METHODS FOR USE IN PROVIDING USER RATINGS ACCORDING TO PRIOR TRANSACTIONS

(75) Inventors: Brian Kundtz, San Jose, CA (US); Zareen Poonen, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 457 days.

(21) Appl. No.: 10/849,962

(22) Filed: May 19, 2004

(65) Prior Publication Data

US 2005/0261919 A1    Nov. 24, 2005

(51) Int. Cl.
G06Q 30/00    (2006.01)
G06F 17/30    (2006.01)

(52) U.S. Cl. .............................. 705/26; 705/14; 705/27; 705/37; 707/104.1

(58) Field of Classification Search ................ 705/14, 705/26–27, 37; 707/104.1
See application file for complete search history.

(56) References Cited

U.S. PATENT DOCUMENTS 6,662,192 B1 * 12/2003 Rebane ..................... 707/104.1
2002/0032668 A1 * 3/2002 Kohler et al. ............... 705/401
2005/0144052 A1 * 6/2005 Harding et al. ............... 705/7

FOREIGN PATENT DOCUMENTS

WO    WO 98/40832    *    9/1998

OTHER PUBLICATIONS

"Reseller Ratings". http://www.resellerratings.com [May 24, 2002] [recovered from www.Archive.org the Internet wayback machine on Sep. 28, 2006].*

"Shoppers to benefit from agreement between Consumer Reports and BizRate.com". PR Newswire. Aug. 30, 1999. p. 8055. [receovered from Dialog database Oct. 10, 2006].*

"Evidence of the effect of trust building technology in electronic markets: price premiums and buyer behavior". MIS Quarterly. Sep. 2002. vol. 26, p. 243(26). [receovered from Dialog database on Oct. 10, 2006].*

"Web-based reputation management systems Problems and Suggested Solutions". Malaga, Ross A. Robert H. Electronic Commerce Research, School of Business, University of Maryland-College Park. Oct. 2001. p. 403. [recovered from Proquest database Sep. 28, 2006].*

International Search Report and Written Opinion, mailed Nov. 22, 2006, for corresponding PCT/US05/13633 (11 pages).

* cited by examiner

Primary Examiner—Jeffrey A. Smith
Assistant Examiner—William J. Allen
(74) Attorney, Agent, or Firm—Darby & Darby PC; John W. Branch

(57) ABSTRACT

The present embodiments provide methods, apparatuses, systems, architectures, computer readable medium, and processes for use in notifying users of other users' transaction ratings. Some embodiments provide a method for use in facilitating transactions between users. This method determines that a first user is interested in entering into a transaction with a second user, determines a summary rating of the second user, and notifies the first user of the second user's summary rating prior to the first user entering into a transaction with the second user. The method can further determine that the second user's summary rating is below a first threshold, generate the notification to the first user to review the second users summary rating, and implement the notification of the first user when the second user's summary rating is below the first threshold. In some embodiments, the method notifies the first user by displaying a warning box.

19 Claims, 9 Drawing Sheets

Auctions Profile

FirstUser (3)

Rating (3)    Live Auctions    Closed Auctions    About Me

GOOD  BAD   TOTAL
 3     -0   = 3 ←712
Details  Details  716
  714

| Auctions with Comments over time | | | | |
|---|---|---|---|---|
| | Past Week | Past Month | Past 6 Months | Total |
| Good | 0 | 2 | 2 | 4 |
| Neutral | 0 | 0 | 0 | 0 |
| Bad | 0 | 0 | 0 | 0 |
| Total | 0 | 2 | 2 | 4 |

730

710

4 auctions with positive comments by 3 unique users
0 auctions with negative comments by 0 unique users
0 auctions with neutral comments by 0 unique users
More about ratings & feedback
  726

All Comments Grouped by User
Showing 1 of 1 pages
Rated a Good    Seller by User_2    ←720
PRODUCT 1 (Feb 15 20:20 2004 PST)                    $20.00
Buyer gives Good Seller rating.
Comment: Highly Recommended YAHOO SELLER (Mar 04 19:38 2004 PST)

Rated a Good    Seller by User_2    ←722
PRODUCT 2 (Feb 15 20:54 2004 PST)                    $15.00
Buyer gives Good Seller rating.
Comment: Highly Recommended YAHOO SELLER (Mar 04 19:39 2004 PST) (most recent)

Rated a Good  Buyer by Selling User_3    ←724
PRODUCT 3 (Sep 09 17:31 2003 PDT)
Seller gives Good Buyer rating.
Comment: fast pay! Thank you (Sep 12 20:36 2003 PDT) (most recent)
Rated a Good  Buyer by RAPTURE45 (143)

Previous Page | Next Page

FIG. 7

METHODS FOR USE IN PROVIDING USER RATINGS ACCORDING TO PRIOR TRANSACTIONS

BACKGROUND OF THE INVENTION

1. Field of the Invention

The present invention relates generally to notifying individuals about potential fraud, and more particularly to notifying users contemplating transactions over a distributed computer network about other user's prior transaction histories.

2. Discussion of the Related Art

The use of the Internet has provided great advances and tremendous access to information. The Internet has also provided a method for conducting transactions between individuals and/or parties. These transactions can take place between individuals and parties that are at great distances from one another.

Unfortunately, some individuals have taken the opportunity to defraud individuals participating in transactions over the Internet. Because of the anonymity provided by the Internet, it is extremely difficult for users to determine who actual defrauded them and how to attempt to seek redress.

It would be beneficial if systems or methods were available that provided users with information about other individuals and/or parties with whom they contemplate conducting transactions. It is with respect to these and other background information factors that the present invention has evolved.

SUMMARY OF THE INVENTION

The present embodiments provide methods, apparatuses, systems, architectures, computer readable medium, and processes for use in notifying users of potential risks in entering into transactions with other users. Some preferred embodiments generate notifications to users recommending that users review other users' transaction ratings and/or histories. These embodiments further monitor and maintain user ratings.

Some embodiments provide a method for use in facilitating transactions between users. This method determines that a first user is interested in entering into a transaction with a second user, determines a summary rating of the second user, and notifies the first user of the second user's summary rating prior to the first user entering into a transaction with the second user. In some implementations, the method further determines that the second user's summary rating is below a first threshold, generates the notification to the first user to review the second users summary rating, and implements the notification of the first user prior to the first user entering into the transaction with the second user when the second user's summary rating is below the first threshold. According to some embodiments, the method notifies the first user by displaying a warning box notifying the first user to review the second user's summary rating. Further, the method can determine that the second user's summary rating is above the first threshold, and prevent the notification to the first user when the second user's summary rating is above the first threshold.

In some embodiment, an alternative method for use in notifying users entering into transactions is provided. This method determines that a first user is interested in entering into a transaction with a second user, determines when the second user has a negative summary rating, generates a notification when the second user has a negative summary rating, and forwarding the notification to the first user. The method can further determine when the second user's summary rating is less than a first threshold, and generate the notification when the second user has a summary rating that is less than the first threshold. Some embodiments further determine when the second user has been performing transactions for less than a second threshold period of time, and generates the notification when the second user has been performing transactions for less than the second threshold period of time.

Alternative embodiments provide an apparatus for use in facilitating transactions. The apparatus comprises a memory that stores ratings and summary ratings, a rating calculator coupled with the memory, the rating calculator receives at least a portion of the ratings and calculates the summary ratings, a ratings evaluator coupled with the memory, the ratings evaluator determines when the summary ratings exceed a first threshold, and a notification generator coupled with the ratings evaluator, the notification generator generates a notification when a first summary rating does not exceed the first threshold. The apparatus can further include ratings counter coupled with the memory, the ratings counter counts a number of ratings received for each user. In some embodiments, the apparatus further comprises a counter evaluator coupled with the ratings counter, the ratings evaluator determines when a number of ratings of a first user does not exceed a second threshold, the notification generator further couples with the counter evaluator, and the notification generator generates the notification when the number of ratings of the first user does not exceed the second threshold

BRIEF DESCRIPTION OF THE DRAWINGS

The above and other aspects, features and advantages of the present embodiments will be more apparent from the following more particular description thereof, presented in conjunction with the following drawings wherein:

FIG. 7 depicts a simplified diagram of an Internet site displaying an example of a user's summary rating information;

Figure 1:
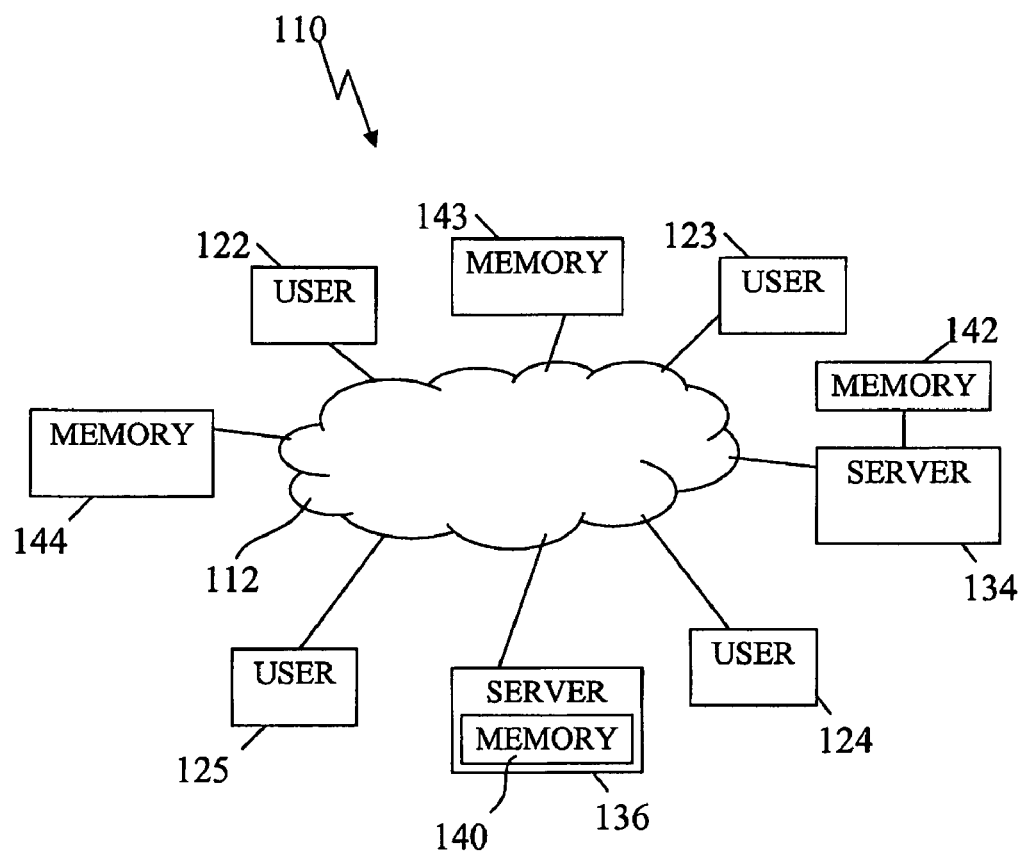
FIG. 1 depicts a simplified block diagram of a system according to some embodiments that allow a plurality of users to communicate and conduct transactions.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

The present embodiments provide apparatuses, systems, architectures, processes, computer readable medium encoded with code segments for implementing processes, and methods for tracking transactions, and providing individuals with information about other users' prior transaction histories. The present embodiments further provide users with the ability to evaluate other users based on the other user's prior transaction histories. In some embodiments, users are rated by other uses with which the users have had transactions. The ratings of a first user allow other users to determine risks of being defrauded or having problems in entering into transactions with the first user.

FIG. 1 depicts a simplified block diagram of a system 110 according to some embodiments that allow a plurality of users 122–125 to gain access to information, for example through searches, to communicate, and to conduct transactions. Each user couples with a distributed network 112. The distributed network 112 allows users to access information, communicate with other users, and transfer data between users 122–125 and/or servers 134 and 136. The distributed network can be implemented through a network such as the Internet or other such distributed networks.

Data can be communicated over the network directly between users 122–126, or data can be communicated over the network through one or more servers. In some embodiments, users gain access to information and/or conduct transactions through one or more servers where the users typically do not directly communicate without communicating through the server. For example, some embodiments allow a first user (e.g., user 122) to post or advertise items and/or services for sale through a server (e.g., server 134). A second user (e.g., user 123) can access the server 134 to retrieve information and/or view items and/or services for sale by the first user. In some implementations, the second user 123 can further offer through the first server 134 to buy an item from the first user 122. If the first user accepts this offer, a transaction occurs for the sale of the item requested. For example, the second user can provide credit card information to the first user, and/or the second user sends money, a check or other payment to the second user. Upon receipt of payment or verification that payment has been made, the first user can send the product purchased to the second user completing the transaction.

In offering items for sale, a user can forward information about the product to be sold to the one or more servers 134, 136. The servers can store the information locally in internal memory 140 and/or external memory 142–144. In some instances, the external memory is directly coupled with the server (e.g., memory 142) and in some instances the memory can be accessed over the distributed network 112.

In preferred embodiments, the one or more servers can track transactions and provide users with information about other user with whom they are contemplating conducting a transaction. For example, the server can track a past history of the first user 122 and supply part or all of that past history to the second user 123 so that the second user can evaluate the risk of conducting the transaction. Some preferred embodiments supply warnings and/or fraud information to users prior to the conclusion of a transaction so that users can better determine whether they in fact want to enter into a transaction with a certain user. Further, some embodiments provide warnings once a user identifies a product and/or service to purchase. For example, when a first user initiates a search for a product, the present embodiments can display a warning to the first user regarding a second user offering the product for sale when the second user has a negative or low rating, or fails to meet other criteria. The present embodiments typically display the warning prominently so that the user is aware of the warning.

In providing fraud information, the servers can request information from users after a transaction has taken place to get feedback from a user about the other party that participated in the transaction. The system 110 and/or a server(s) 134, 136 evaluates the feedback and maintains statistics on users based on the feedback.

In some preferred embodiments, each user is tracked and a rating is generated based on prior transactions. Other users can access or are supplied with the ratings about other users. The rating can be generated based on feedback from other users interacting with and/or conducting transactions with a user. Feedback of a first user received from other users is recorded and a rating is determined based on the feedback. For example, other users can rate a first user as GOOD, BAD or NEUTRAL. The system can apply a +1 value for each Good rating, a −1 value for each Bad rating, and a zero (0) for each Neutral rating. In some embodiments, a user's rating can further be adjusted based on requests for claims adjustment from users that did not receive items purchased after payment was made. A summation of the ratings can then be generated. This summation or a derivative of the summation can be provided to other users, for example, in the form of a total rating score, a number of icons (e.g., five stars "*" indicating a good rating and one star "*" indicating a poor rating; "thumbs-up" or "thumbs-down" symbols; and other such icons), a percentage rating (e.g., based on other users ratings, based on a threshold level, or other such percentages), and/or other such indications. The summary rating can further be based on other criteria and/or additional criteria. For example, a user's summary rating can be decreased if complaints are submitted about the user other than through ratings, if a buyer protection claim is filed against a user, and other such factors.

In some embodiments, the rating summation is limited so that each rating used in determining the summary rating is from a unique rater. For example, if a first user rates a second user ten (10) times, only one of those ten ratings is used in determining the summary rating. Further, the rating from a unique rater can, in some instances, be the most recent rating. Again for example, if the first user rates a second user with a GOOD rating, a +1 rating can be applied to the summary rating. If the first user later rates the second user with a BAD rating, the +1 rating is removed and a −1 rating is applied when determining the summary rating for the second user.

Based on the summary rating (e.g., the summary rating of the second user) other users can evaluate the second user to determine the risks associated with entering into a transaction with the second user. The summary rating can identify a total summary rating, a total number of ratings received, a history of ratings, whether the user was ever prevented from carrying out transactions, whether the user failed to deliver products, whether the user is a verified user (as described fully below) and other such information. Additional information can be provide with the summary rating and/or a user's transaction history including, but not limited to, seller and buyer IDs, dates indicating completions of transaction, title of the transaction or auction, potentially an Internet link to access data and/or a web page of the transaction, and other such data.

The system 110 can allow users to access a summary rating in determining the risks in entering transactions with other users. In some preferred embodiments, the system further notifies or warns a first user when a second user with whom the first user is considering entering into a transaction with has a summary rating below a desired level or threshold. Some embodiments notify a first user when a second user has participated in less than a fixed or threshold number of transactions. This notification can be generated because the accuracy of the second user's summary rating has not been established based on an insufficient record. Additionally and/or alternatively, some embodiments notify a first user when a second user has been rated by other users less than a fixed or threshold number of times.

Further, some embodiments notify a first user when a second user has not been registered with the system for greater than a fixed or threshold period of time. For example, if the second user is a new user, and has only been registered with the system for less than a fixed period of time (e.g., 60 days), the system can generate a notification that the second user's summary rating has not been verified for a long enough period of time.

The warning regarding another user's rating can be provided at substantially any time during the process of finding an item or service, negotiating a transaction and completing the transaction. For example, a warning is displayed, according to some embodiments, when a first user initiates a search for a desired product and a list of products that potentially meet the criteria of the first user's search. A warning can additional and/or alternatively be displayed once the first user selects an item indetified through a search or other means. Similarly, a warning can be displayed once the first user offers to buy or bids on a product. Additionally, a warning can be displayed on a notification that the first user is the highest bidder or has had an offer to purchase accepted, or at substantially any stage of a transaction.

Figure 2:
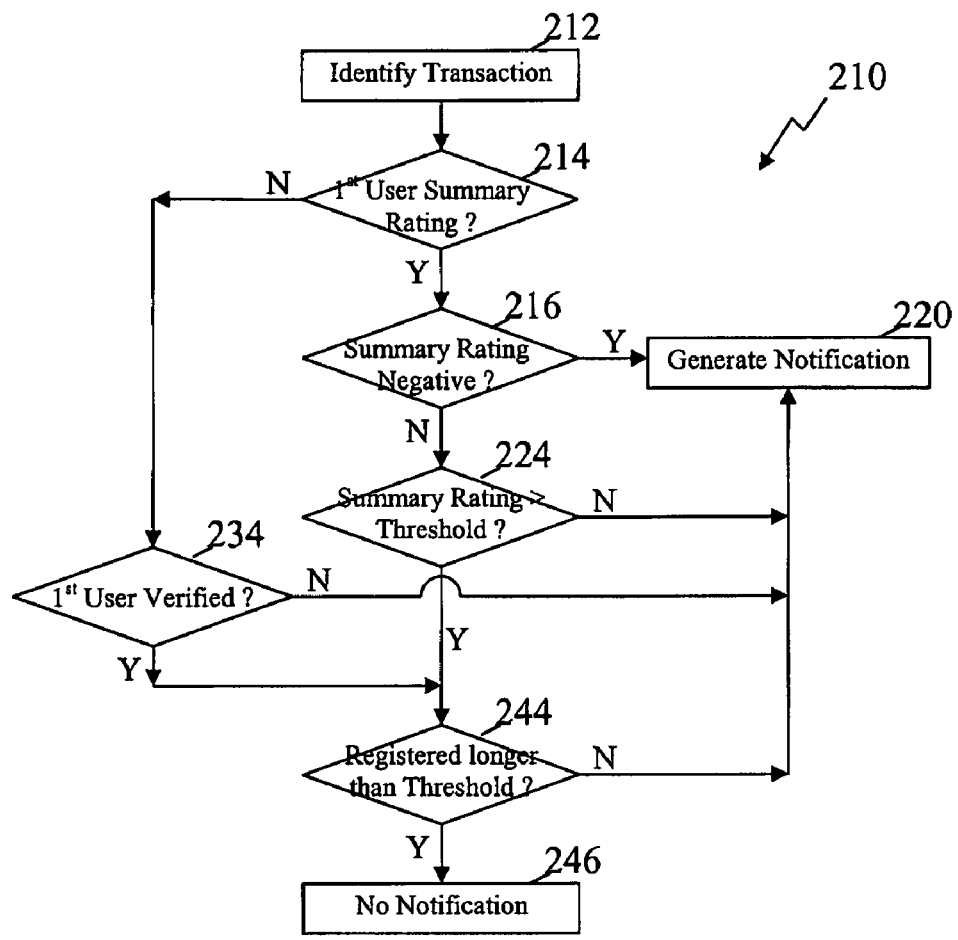
FIG. 2 depicts a simplified flow diagram of a process for determining if and when a user should be notified about other user's summary ratings.

FIG. 2 depicts a simplified flow diagram of a process 210 for determining if and when a user should be notified about other users' summary ratings. In step 212 the process identifies that a first and second user are considering entering into a transaction. For example, if a first user is selling a product by auction, the process can recognize when the second user is identified as being the winning bidder. As another example, the first user's product can be identified as meeting the second user's search of a product, such that a warning might be displayed with a list of identified products meeting the search. As yet another example, the system can detected that the second user has accessed information about the product being sold by the first user. In step 214, it is determined if the first user has a summary rating. If the first user has a summary rating, step 216 is entered where it is determined if the summary rating is negative. If the summary rating for the first user is negative step 220 is entered where a notification or warning is generate and forwarded to the second user. The notification can recommend that the second user access the first user's rating and/or transaction history information, or can simply provide the rating information. Additionally and/or alternatively, the notification can include the first user's summary rating and/or other transaction history.

If it is determined in step 216 that the summary rating for the first user is not negative, step 224 is entered where it is determined if the summary rating of the first user exceeds a summary rating threshold. For example, the step 224 can determine if the first user's summary rating is greater than a +10 value. The summary rating threshold is defined by the system and can vary for different types of users, different types of transactions, the costs of products, and other such criteria. Further, the threshold can be dynamic such that the system can vary the threshold(s) based on feedback, evaluation of statistics, user input and complaints and other such parameters. If the first user's rating does not exceed the summary rating threshold, the process continues to step 220 where a warning is generated and forwarded to the second user.

If the process determines in step 214 that the first user does not have a summary rating, step 234 is entered where the process determines if the first user is a verified user. In some embodiments, the system can allow users to be verified and/or provide safeguards. For example, some users can be verified users by registering such that payments are forwarded to independent third parties, recognized by the system, which then forward payments to the selling user. Some users can post a bond or deposit money, and/or provide insurance that can be accessed by the system operators in the event that the users attempt to defraud other users. Additionally and/or alternatively, users can be registered as PayDirect address verified, such that the system and/or operators have verified a users' address. Other types of user verification as are known in the art can be conducted to certify that the user is a legitimate user with minimal risk of fraud.

The system, in some implementations, may limit some users (e.g., individual users) to register with the system only upon providing a credit card number, and limiting that credit card number to be associated with a single user ID. Further information about a user can also be required, such as E-mail address, billing address of credit card, alternate mailing address, recording an Internet Protocol address from which a user registers and/or accesses the system, and other such information. If the first user is not a verified user, the process 210 continues to step 220 where a warning or notification is generated and forwarded to the second user.

If it is determined in step 216 that the first user's summary rating is not negative and that the summary rating is greater than the threshold in step 224, and/or that the first user is a verified user in step 234, the process continues to step 244 where it is determined if the first user has been registered and/or has been active with the system for longer than a threshold period of time. This threshold period can be set to substantially any period of time, and is typically determined by the system operators depending on the types and/or costs of transaction, the time period expected to determine that a user is a legitimate user and other such criteria. If the first user has been registered and/or active for at least the threshold period of time, the process terminates in step 246 without generating a warning or notification to the second user suggesting that the second user should review the first user's summary rating. Alternatively, if the first user has not been registered and/or active for the prescribed period of time, the process continues to step 220 where the notification and/or warning is generated and forwarded to the second user.

Figure 3:
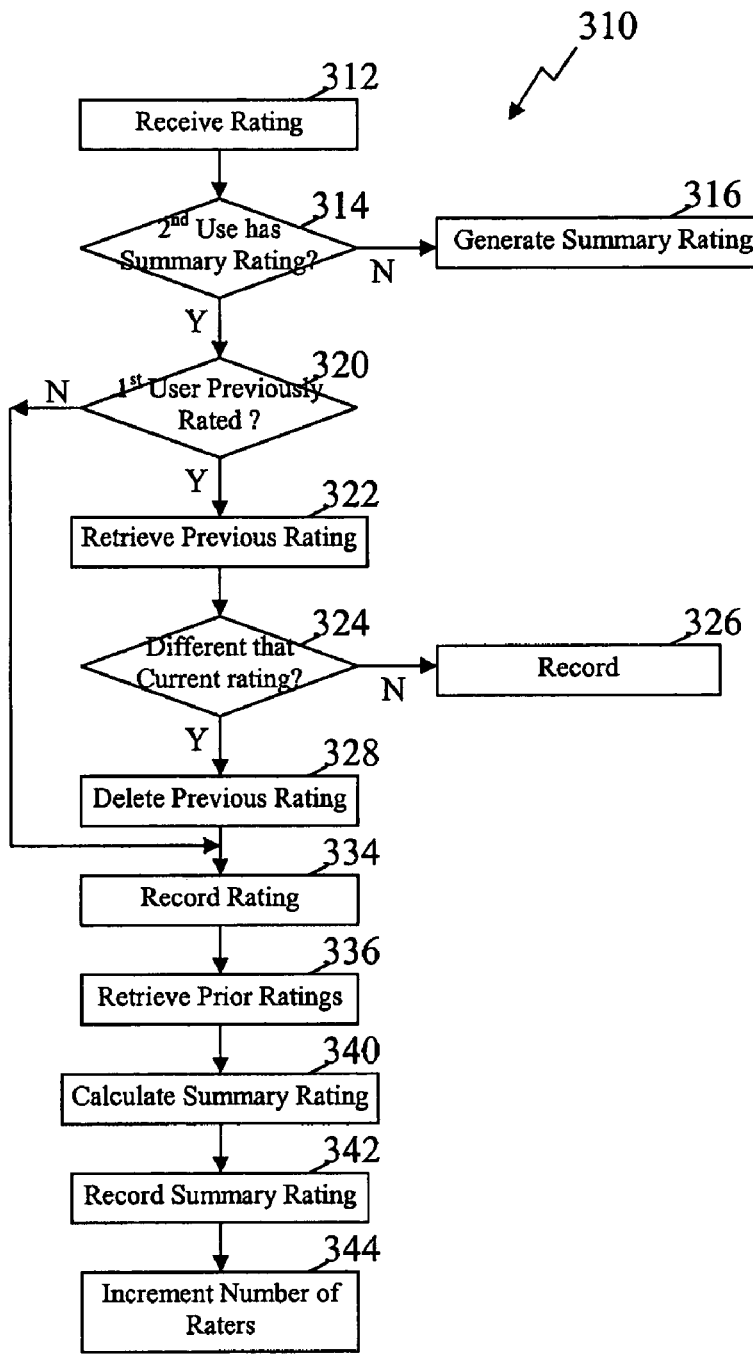
FIG. 3 depicts a simplified flow diagram of a process for use in generating and maintaining a user's summary rating.

FIG. 3 depicts a simplified flow diagram of a process 310 for use in generating and maintaining a user's summary rating. In step 312 a new rating is received, for example a first user submits a rating about a second user. In step 314, it is determined if the second user has a summary rating. If the second user does not have a summary rating, step 314 is entered where a summary rating is generated based on the first user's rating. Following the generation of the second user's summary rating, the process continues to step 334, described fully below.

If it is determined in step 314 that a summary rating exists, the process alternatively proceeds to step 320 where it is determined if the first user has previously rated the second user. If the first user has rated the second user, step 322 is entered where the first user's previous rating of second user is retrieved. In step 324, the process determines if the previous rating is different than the current rating. If the previous and current ratings are the same, step 326 is entered where the new rating from the first user is recorded, the summary rating is not altered and the process 310 terminates. Alternatively, if the previous and current ratings are different, the previous rating is removed from the calculation of the summary rating in step 328. Typically, the system does not delete previous ratings as these rating are maintained for further transaction history data, further statistics, and other such uses. In some implementations, old ratings may be deleted, for example, ratings older than one year or some other time period.

Following step 328, and if it is determined in step 320 that the first user did not previously rate the second user, step 334 is entered where the first user's current rating is recorded and associated with the second user's ratings. In step 336, all of the relevant ratings associated with the second user are retrieved. In some embodiments, a user's ratings that are older than a predefined period may be purged or not used in the calculation of summary rating so that the summary rating is maintained as current. In some implementations, only a last predefined number of ratings are used (for example, only the last 50 ratings might be used in the calculation of the summary rating).

In step 340, the second user's summary rating is calculated based on all of and/or the relevant ratings of the second user. In some alternative embodiments, the process may recalculate or adjust the summary rating based on the new rating instead of recalculating the summary rating based on all of the relevant previous ratings. For example, the summary rating can be summed with the new rating (e.g., summary rating (e.g., +10)+new rating (e.g., −1)=new summary rating (e.g., +9)). In step 342, the second user's summary rating is recorded and associated with the second user. In step 344, a total number of raters of the second user is incremented to reflect that an additional user has rated the second user.

Figure 4:
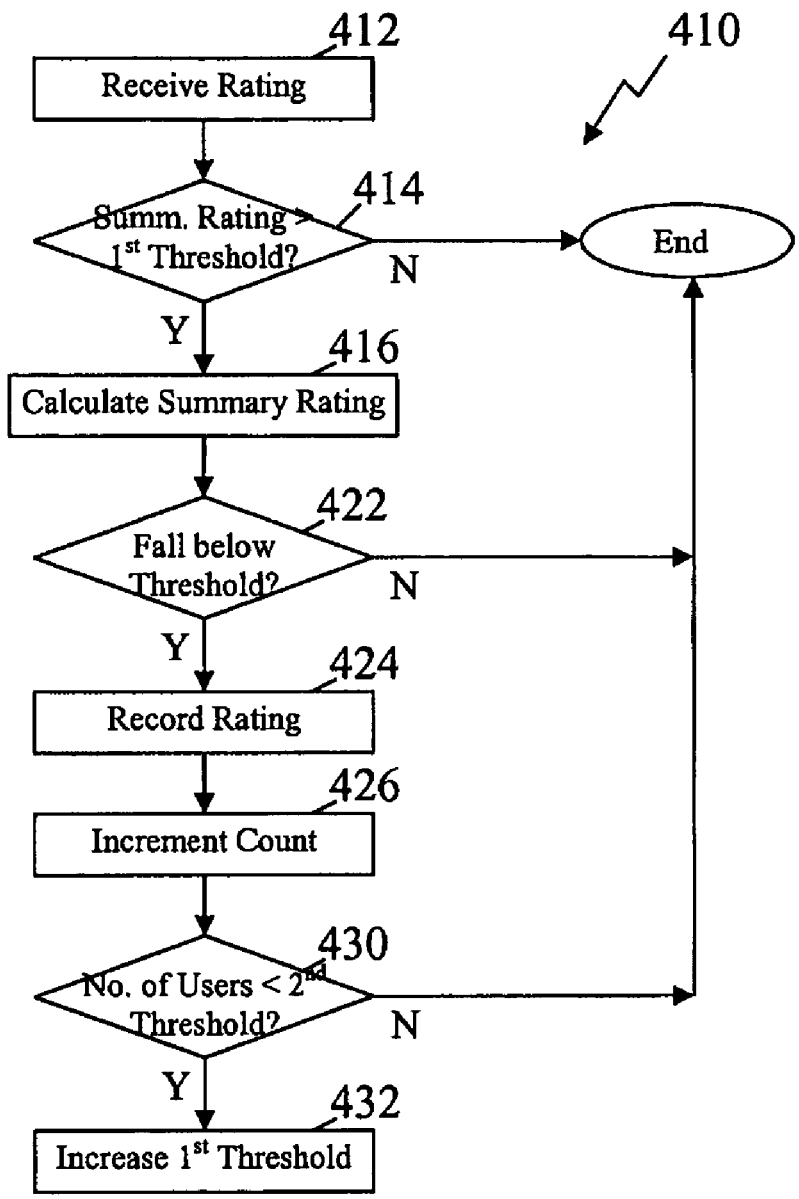
FIG. 4 depicts a simplified flow diagram of a process according to some embodiments for use in maintaining a relevant summary rating threshold.

FIG. 4 depicts a simplified flow diagram of a process 410 according to some embodiments for use in maintaining a relevant summary rating threshold. In some preferred embodiments, the systems and/or methods are dynamic such that parameters, criteria and/or thresholds can be adjusted to maintain the systems and methods as current, and effective. The process 410 of FIG. 4 is one example of one implementation for allowing the systems and/or methods to be dynamic by, at least in part, adjusting the threshold if too many users' ratings are fluctuating between above and below the threshold indicating that the threshold may not be, for example, high enough.

In step 412, a rating of a user is received, for example, a first user submits a rating of a second user. In step 414, it is determined if the second user's summary rating is equal to or exceeds a first summary rating threshold. The summary rating threshold identifies the user as a relatively lower risk if the user's summary rating equals or exceeds the threshold, and identifies the user as a potential risk or is a higher risk when the summary rating is below the threshold.

If the second user does have a summary rating that is equal to or exceeds the summary rating threshold, step 416 is entered where the user's summary rating is recalculated. The recalculating can be implemented through a process similar, at least in part, to the process 310 of FIG. 3 and/or other processes. In step 422, it is determined if the second user's recalculated summary rating falls below the first summary rating threshold. If the second user's recalculated summary rating does fall below the first summary rating threshold, step 424 is entered where the second user is recorded. In step 426 a total number of users that have recalculated summary ratings that have dropped below the first threshold in incremented.

In step 430, the process 410 determines if the total number of users having recalculated summary ratings that fall from above to below the first threshold exceeds a second dropped rating threshold. In some embodiments, the number of users having recalculated summary ratings that fall from above to below the first summary rating threshold may be limited to summary ratings that have been recalculated within a predefined period of time (e.g., 1 week, 1 month, 3 months or other such relevant time periods depending on the number of users, the frequency of users falling from above to below the summary rating threshold and other such criteria). Further, the total number of users that have dropped below can be based on a period of time (e.g., those users that have dropped below within the last 6 months. If it is determined in step 430 that the number of users having recalculated summary ratings that fall from above to below the first threshold exceeds a second dropped rating threshold, step 432 is entered where the first rating summary threshold is increased. For example, the process 410 can increase the first summary rating threshold by a single value (e.g., +1), by a fixed about (e.g., +5) or other such adjustments. Alternatively, if the conditions of steps 430, 422, and/or 414 are not meet, the process 410 terminates.

The summary rating threshold can similarly be decreased in some implementations, for example, if not enough user's ratings exceed the threshold. The systems and/or methods provide for other changes and variations in parameters and/or criteria besides the summary rating threshold. Some implementations can monitor the value of priced products and the ratings associated with users buying and selling products in price ranges. Additionally, some implementations monitor and adjust the summary rating threshold based on the types of products being sold. Other parameters and statistics can be monitored and evaluated allowing the systems and methods to be dynamic.

As described above, users can access the system through a distributed network. In some embodiments, one or more servers are utilized to generate one or more Internet sites that allow users to access information about available transactions facilitated through the system. The present embodiments can generate the notification and/or warning to users by generating and displaying a notification on the Internet site. For example, the system can generate and display a separate graphical box or pop-up that prompts and/or recommend that a user access another user's summary rating, or simply displays an alternative Internet site with the other user's summary rating and/or transaction history information.

Figure 5:
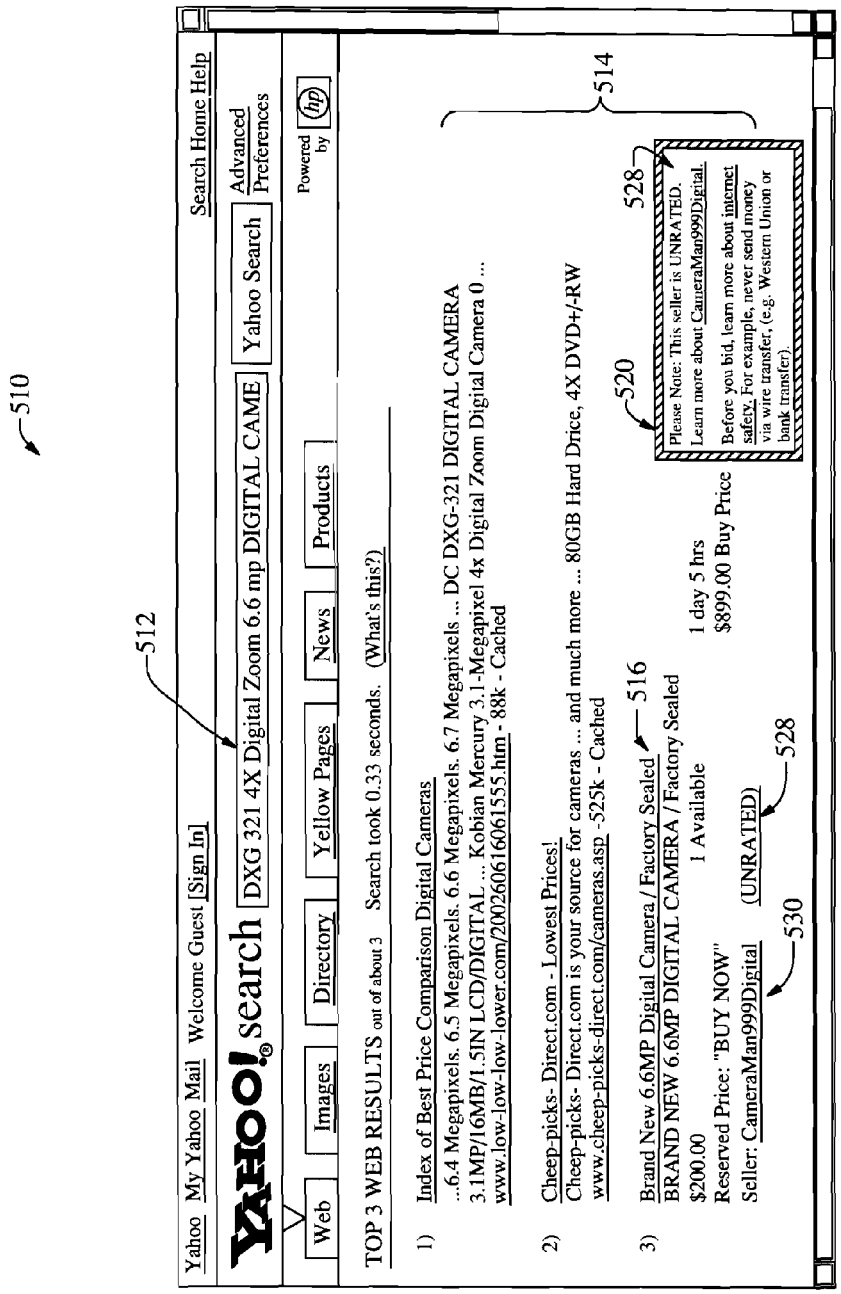
FIG. 5 depicts a simplified diagram of a list of products identified by a search method and/or engine, displayed for example through an Internet site.

As described above, some embodiments display a warning when a product and/or service meets search criteria entered by a user. FIG. 5 depicts a simplified diagram of a list 510 of products identified by a search method and/or engine, such as a search engine operated by Yahoo!™, and displayed, for example through an Internet site. The search results include a user's search criteria and/or terms, indicated by reference numeral 512. The search engine accesses one or more databases and/or other storage of information to identify entries 514 that match and/or closely match the search criteria 512. The identified entries 514 are typically displayed, usually in a listed order dictated by the search method, such as how closely the identified entry matches the search criteria 512.

Some search results 514 may include information and/or links to products and/or services 516 that are for sale by other users (where the other users can be individuals, companies, partnerships, distributors, manufactures, and other such users utilizing transaction systems, such as Yahoo! Shopping, Yahoo! Auctions, other auction Internet sites, other Internet sites for selling products, and substantially any other venue for transactions where a user can retrieve data). The present embodiments generate and display a notice or warning 520 when a product 516 is offered for sale by a user 530 with a rating 528 that does not meet predefined criteria, such as the criteria described above (e.g., summary rating is below a threshold, user has not been a registered member for a predefined period of time, the user has not participated in a threshold number of transactions, and other such criteria). The notice can include a user's rating 528, a link or other access to a user's summary rating and/or transaction history information, other suggestions, recommendations and/or information.

Figure 6:
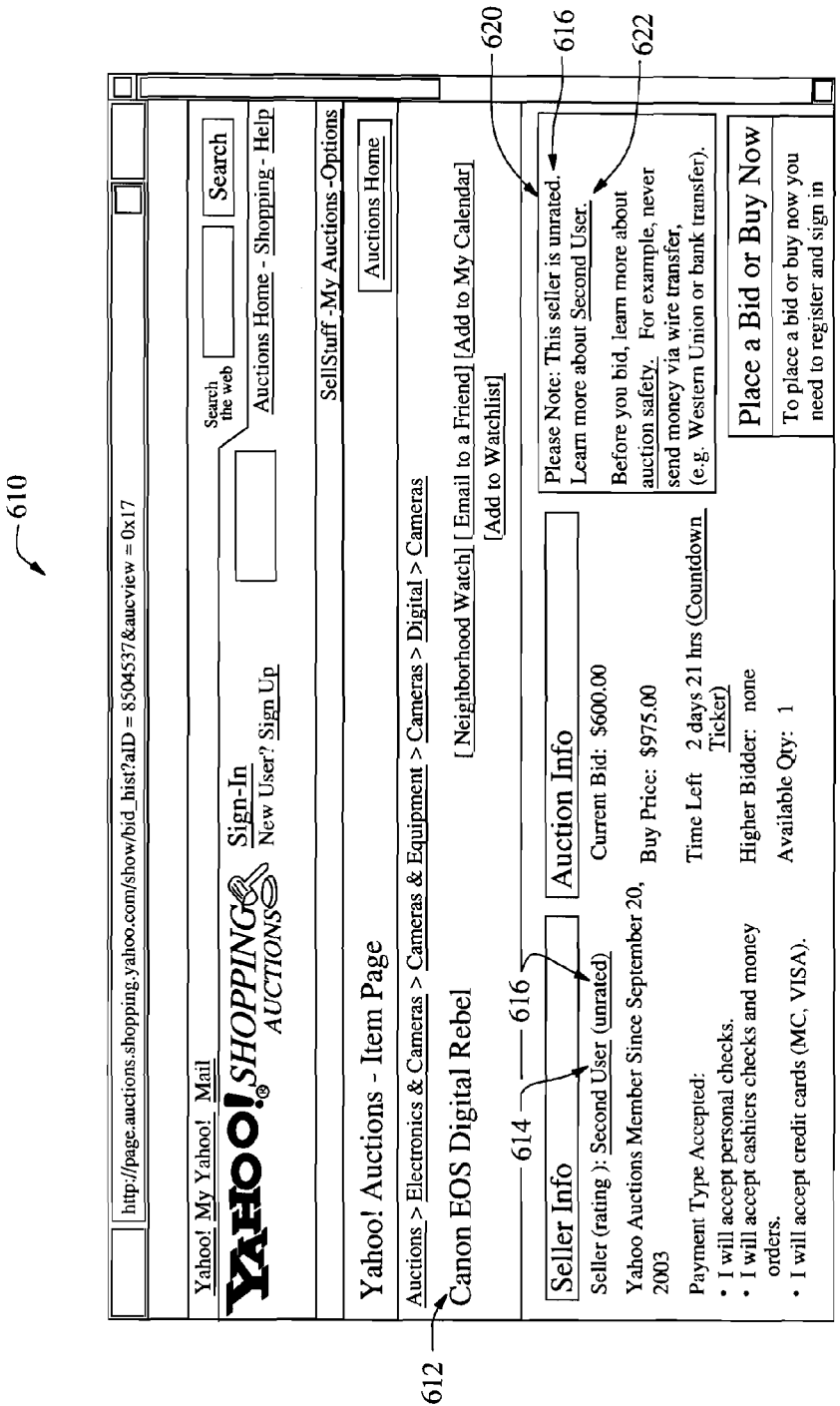
FIG. 6 depicts a simplified diagram of an Internet site that a user accesses, according to some embodiment, to participate in transactions facilitated by the present embodiments.

FIG. 6 depicts a simplified diagram of an Internet site that a user accesses, according to some embodiment, to participate in transactions facilitated by the present embodiments. In the example shown in FIG. 6 an Internet site 610 is shown. A potential transaction is displayed on the site 610. In this example, a first user is contemplating submitting an auction bit to purchase a camera 612 from a second user 614. The site could be accessed through an auction site, through a list obtained through a search (such as the list 610 of FIG. 6) and other such access. A rating 616 of the second user is identified on the Internet site 610 as "unrated." The Internet site further shows a notice 620 indicating that the second user is "unrated," and recommending that the first user take precautions and/or learn more about the second user.

The present embodiments can display and/or position the notification 620 at substantially any position on the displayed Internet site 610. In some embodiments, the positioning of the notice 620 is varied and the effectiveness of position is evaluated. Based on the evaluation, the present embodiments can position the notices in a position that optimizes the notification without adversely interfering with a user's access and use of the Internet site. This positioning can be different for different user, different for different types of transactions, and different depending on other parameters.

The notice or warning box 620 can include information and/or suggestions for the first user. The information and/or suggestions can be dependent on the rating of the second user, the criteria utilized to determine the second user's rating, the product and/or services offered by the second user, and other such criteria. For example, the notice 620 can warn about how to send payment, recommend using an escrow company, purchasing insurance, and other such information. The notice or warning box typically includes a user's ID or name 622 (e.g., "Second User"), and user's rating 616. The notice can further include other criteria utilized in determining a user's rating, such as number of negative ratings, number of complaints about the user, number of buyer protection claims asserted against the user, and/or other such criteria.

The notice 620 can additionally include other data and/or links to additional data about the user. For example, the notice can include a link 622 to access a user's summary rating and transaction history information (see for example, FIG. 7). A link can be included to allow access to a buyer's and/or seller's credit history. In some implementations, if the second user's rating is below a certain level, the notice 620 can include one or more links to other sellers that are selling the same or a similar product, where the other sellers have ratings that are higher than the second user's rating. Therefore, if a buyer is uncomfortable purchasing a product for a seller because of the seller's low rating, the notice 620 offers the buyer links to other sellers with higher ratings.

The notice box 620 can include a brief history, for example, when a second user has had a recent change in ratings (e.g., if the second user recently received negative ratings). This recent change can be defined by any number of criteria and can be limited to defined time frames. For example, the notice box 620 can display the recent changes in ratings if the second user has had more than two consecutive negative ratings, or more than two negative ratings in a predefined period of time (the predefined period of time can further depend on the types of products being sold, the number of products sold by the second user, and other such criteria). The brief history can additionally indicate when a user receives positive ratings. The brief history can also display a total number of transactions performed by the second user and other such history.

In some implementations, the notice box 620 relating to a second user can include a user selectable option. When the first user selects this option, the system tracks the second user's rating, and once the second user's rating increases a certain amount and/or beyond the threshold, the system notifies the first user.

Some embodiments the notice 620 further include recommendations, information and/or links to recommendations and information. Typically, the recommendations and/or information are related to the transaction. For example, the notice 620 can include information and/or links to information to learn more about cautions in purchasing over the Internet, about auction safety, methods and practices for paying for products, and other such information. The notice 620 can further include recommendations for purchasing insurance for a transaction. Displaying a recommendation for insurance with the notice can be limited to transactions according to parameters and/or criteria, for example, the cost of a product, the buyer or seller's rating, other history about the buyer and/or seller, size of a product, type of product, quality of desired product, and other such criteria. A recommendation to utilize express service and/or an escrow service can also be included in the notice 620. Again, the inclusion of express service and/or an escrow recommendation can be limited based on criteria, such as the criteria for recommending insurance. Similarly, the notice 620 can recommend a bonded transaction.

In some implementations, the notice can provide additional links and/or advertising to allow users to access more information and/or to access companies' Internet sites that offer insurance, escrow companies, bonding services, the company of the product the user is considering purchasing, companies providing the same or similar products and/or related products, and other companies, and information. The notice 620 can additionally include, in some embodiments, advertising for products similar to the products being considered by a user. For example, the notice can provide information and/or links to a newer model of a product currently being considered (e.g., if a user is considering purchasing a personal digital assistant, the notice can include a link to a newer model of the same or a different personal digital assistant). Similarly, the notice can include advertising for related products to the product being considered (e.g., if the user is considering a camera, the notice may include advertising for camera lenses, camera carrying cases, film, and/or related products). In some embodiments, the notice 620 can include pricing information of the same or similar products from other users, users of different sale or auction Internet sites, and/or other sources. Similarly, the notice 620 can include a retail price as recommended by the manufacturer allowing the user to better evaluate the purchase price and the product.

The notice can, in some implementations, include links to access information regarding other users selling the same or a similar product when the original product considered by a first user and offered for sale by a second user is no longer available from the second user. Additionally, the notice can provide a link back to the original Internet site and/or information about the original product offered by the second user when the product is no longer available from the second user (e.g., an auction for the original product has ended).

In some embodiments, the notice 620 can additionally include incentives and/or coupons for the desired product, an upgraded or new model of the product currently being considered, related products and other such incentives. Similarly, the notice 620 can include coupons or incentives to insurance provided, escrow companies, bonding companies and other such services. Some coupons can be provided based on a users activity, for example, loyalty coupons in an attempt to have the user continue to conduct transactions through the system.

FIG. 7 depicts a simplified diagram of an Internet site displaying an example of a user's summary rating and transaction history information 710. The summary rating and history information includes a total summary rating 712. Further, the total Good ratings 714 and total Bad ratings 716 are also displayed. In this example, the total rating includes ratings of a first user (e.g., FirstUser) as both a seller (rating 720 and 722) and as a buyer (rating 724). The history information can include a summary of past history 726 (for example, the first user participated in four (4) transactions with positive comments from three unique users). The summary can also include a time line rating history 730 allowing other users to identify if the first user's rating does not reflect current activities. For example, if a user has good ratings six months ago, but only bad ratings in the past month, some users may evaluate the first user as a greater risk than a summary rating may indicate.

In some embodiments, the history rating 710 can include additional information, recommendations, links to other information, advertising, related product information, links to other sellers of the same or similar products, pricing of other products sold by the user, and/or other information, recommendations, and access to other information.

Figure 8:
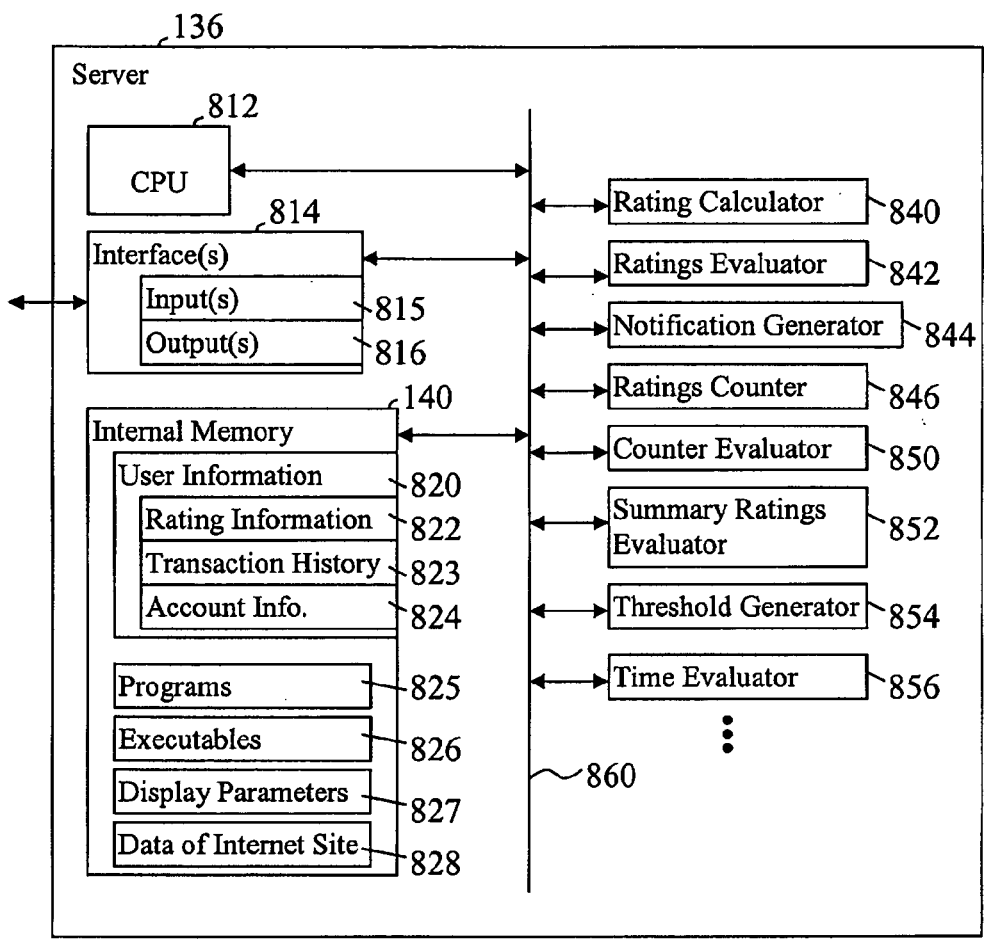
FIG. 8 depicts a simplified block diagram of a server, such as the server of FIG. 1, according to some present embodiments.

FIG. 8 depicts a simplified block diagram of a server, such as the server 136 of FIG. 1, according to some embodiments. The server 136 generates the Internet site, such as the Internet site 610 shown in FIG. 6, to facilitate transactions between two or more users. The server can include one or more central processing units (CPU) 812 that control the server 136. The CPU can be implemented through a computer, a microprocessor and/or other controller(s) or combinations of controllers. One or more interfaces 814 are included in the server 136, including one or more input ports 815 and one or more output ports 816 (and/or bidirectional ports). The interface 814 at least in part couples with the network 112 allowing the server to communicate with other components (e.g., user's computers, other servers, and memory) coupled with the network. The interface 814 can further allow the server 136 to couple with periphery devices, such as external memory, printer(s), display(s), keyboard(s), pointer device(s), and other such periphery devices.

The server 136 can further include an internal memory 140 and/or can couple with external memory (e.g., external memory 142 coupled directly with the server, and/or one or more memories 144 coupled with the server 136 through the distributed network 112). The memory can store user information 820, including rating information 822 (summary rating, all ratings received, total number of ratings, and other such relevant rating information), transaction history information 823 (prior purchases, prior sales, prior auction bids submitted, and other such transaction history), account information 824 (e.g., email address, mailing address, credit card information, and other such information), and other similar user information. The memory can additionally store programs 825 and executables 826 for the operation of the server, the communication with users and other components of the system, the operation of one or more Internet sites, the generation of notification to users, the displaying of notifications to users, the locations of notifications on a display, and other such data. The memory can include display parameters and data 827 for the generation of an Internet site, and data to be included on the Internet site 828, such as data about products for sale by users, advertising information to be displayed on the Internet site, and other additional data. Other data and/or information can be included in the memory.

In some embodiments, the server 136 includes sub-processors or functional devices that perform some of the functional capabilities of the server. The sub-processors can include a rating calculator 840, a ratings evaluator 842, a notification generator 844, a ratings counter 846, a counter evaluator 850, a summary ratings evaluator 852, a threshold generator 854, and other such sub-processors. In some alternative embodiments, the CPU 812 can include and/or perform the functions of one or more of the sub-processors. Additionally and/or alternatively, some of the sub-processes can be implemented through external devices accessed by the server 136.

The rating calculator 840 receives and/or retrieves from memory at least a portion of the ratings for users and calculates summary ratings for the users. The ratings evaluator 842 determines when the summary rating for a user exceeds a first threshold (e.g., a threshold indicating that a notice does not need to be forwarded to other users). The notification generator 844 can couple with the ratings evaluator, so that the notification generator can generate a notification when a summary rating does not exceed the first threshold. The ratings counter 846 couples with the memory and counts the number of ratings received for each user. The counter evaluator 850 determines if a user has received a predefined number or second threshold of ratings. The notification generator can further couple with the counter evaluator to generate a notification when the number of ratings of a user does not exceed the second threshold.

The summary ratings evaluator 852 couples with the ratings evaluator, and determines whether a third threshold number of a first group of users having summary ratings that at one point exceeded the first threshold and have had their summary ratings adjusted below the first threshold. This allows the system to more accurately define the summary rating threshold to verify that it is not set too low so that users become verified as low risks, and then are re-evaluated as potential risks. A threshold generator 854 couples with the summary ratings evaluator 852, to adjust the first threshold when the number of the first group of users exceeds the third threshold.

Some embodiments include a time evaluator 856 that verifies that a user has been registered with the server and/or system for a minimum time period. For example, the time evaluator can notify the notification generator 844 that a first user has been registered for less than 60 days. The notification generator can then display a notification and/or cause a notification to be forward to other users that the first user has been registered for a limited time and has not been verified as a lower risk.

The server 136 and/or the CPU 812 can include other sub-processors to perform other functions. One or more buses 860 or other internal communication coupling between CPU 812, memory 140, interfaces 814 (to other memory, users and/or other components), and sub-processors is also included within the server 136.

Some embodiments further monitor, track and manage other parameters, statistics and/or criteria in an attempt to further optimize operation and the notification of potential higher risk users. For example, some embodiments determine a total number of users, and/or a total number of active users (defined by substantially any criteria, such as, users that have accessed the system within the past 90 days). The number of users can further be sub-divided into a total number of users that meet certain criteria, such as total number of users that are selling products through the system, total number of users that have entered into more than a predefined number of transactions, and other sub-divisions.

Further, some embodiments can further determine a total number for each type of users, where the "type" is defined as "Negative", "Unrated", "Rated", "Good", and other such types. A percentage of users of each type can also be determined (e.g., total number of type/total number of users). Still further, categories of transactions can be defined, and users can be defined according to the categories in which they partake. The categories can be substantially any categories according to the transactions provided by the present embodiments. For example, categories for sales of products can be defined as: Apparel, Accessories & Shoes; Bargains; Beauty; Books; Computers & Office; DVD & Video; Electronics; Flowers & Gifts; Health & Personal Care; Home, Garden & Garage; Jewelry & Watches; Music; Sports & Outdoors; Toys & Baby; Shop by Brand; Consumer Information (e.g., Consumer Reports®, PC World Reviews and other such consumer information); Auctions (e.g., Yahoo! Auctions); Shop by Store; Shopping by defined parameters (e.g., Yahoo! SmartSort); and other such categories. Other categories can be defined depending on the implementation of the embodiments.

A total number of users participating in transactions in each category can be determined. A percentage of users per category can further be determined (e.g., total number of users participating in a category/total number of users). Further, the total number for each type of users or seller (types=Negative; Unrated; Rated; Good, etc.) can also be determined for each category, as well as a percentage of users for each type of user for each category (e.g., total number of type in a category/total number of users in category).

Some categories allow for different kinds of transactions. For example, a category "Electronics" can allow for Auctions, user-to-user transactions, user-to-store transactions, and other such kinds of transactions. As such, the present embodiments can in some implementations further determine a total number of kinds of transactions per category (e.g., determine a total number of auctions from each category type of user, per category). The total number of kinds of transactions from each type of user can also be determined per category (e.g., determine a total number of auctions from each category type of user, per category). Percentages of kinds of transactions per category, as well as percentage of types of users per kinds of transactions for each category can also be determined. These statistics allow the present embodiments to, in part, determine whether higher risk users operate in certain categories, and whether higher risk users are more likely to participate in certain kinds of transactions (e.g., auctions). This allows embodiments to adjust threshold levels based on category, kinds of transaction, and/or other such criteria.

Some implementations further determine a total number of bids on auctions from each type of user per category. A percentage of number of bids on auctions from each type of user per category can similarly be determined. Further, a total number of negative ratings per type of user pre category, and a percentage of number of negative ratings per type of user, pre category can also be ascertained.

In some implementations of the present embodiments, users can purchase insurance to insure against fraud during a transaction. The present embodiments can further determine the total number of insured transactions, a percentage of insured transactions relative to the total number of transactions, the total number of insurance claims, a total number of insurance claims for each type of user, a total number of insurance claims pre category, a total number of insurance claims for each type of user per category, a percentage of insurance claims for each type of user pre category (total insurance claims per category/total transactions per category), and other such statistics relative to insured transactions. Further, some implementations compare total insurance claims and percentages to gross merchandise sales (GMS), auctions, number and/or types of bids and other such statistics.

These statistics allow the system operators to, at least in part, determine the confidence of users in the security of transactions. Further, these statistics allow system operators to adjust thresholds in an attempt to improve user confidence, and to track whether changes affect user confidence.

The present embodiments further determine statistics related to user ratings. For example, a total number of users accessing summary rating information on other users can be compiled. A percentage of users accessing summary rating information on other users can also be generated (e.g., users accessing summary/total users entering transactions; or users accessing summary/total users bidding). As indicated above, some implementations determine placement on a display (e.g., placement within an Internet site) of a notice to a user recommending the user check another user's summary rating. For example, a total number of users accessing summary rating information on other users according to placement can be determined. A percentage of users accessing summary rating information on other users can similarly be determined (e.g., users accessing summary/total users (bidding and/or entering transactions) according to placement).

The rating thresholds defining when a user receives a notification and/or warning box can vary based on numerous conditions, criteria, parameters and statistics. For example, the threshold level for displaying a notification can be higher for more expensive products and lower for less expensive products. Further, for products that are below a certain value, one or more thresholds can be eliminated, so that in some instances a user does not receive a warning when a second user's rating is below a threshold and/or has not participated in a threshold number of transactions.

As discussed above, the present embodiment can maintain statistics on the displaying of notifications and use of the notifications to access further user information/history, further information on recommendations, access to related products, use of coupons and other such statistics related to the displaying of the notification and the action of users based on the notification. The system further adjusts threshold levels and criteria in determining when to display a notification and what to include within the notification based on the statistics. Following adjustments the statistics are continued to be tracked so that further adjustments and fine tuning can be implemented. In some implementations, additional statistics are monitored and/or previous statistics are more rigorously examined during a predefined period of time following an adjustment to a threshold or other adjustment. The utilization of the statistics allows the system to be dynamic and flexible. The system can tailor the notifications based on the types of transactions, the costs of transactions, the types of user, and other such criteria.

In some embodiments, users that have summary ratings below a defined threshold are prevented from participating in further transactions facilitated by the system. In some instances, this denial of access can further be limited by the number of transactions and/or the time period in which the user participates in transactions.

For example, a user selling products may be denied access if the user has a negative five (−5) summary rating. Further, a user may be denied access if the user obtains a summary rating of a negative three (−3), when the user has participated in less than five (5) transactions. Similarly, a user may be denied access if the user obtains a summary rating of a negative three (−3), when the user has been registered for less than one month. These values for summary ratings, the number of transactions, and time periods defined are simply examples, and the embodiments are not limited to these values. Alternatively, some present embodiments evaluate these values and can make adjustments to these values to avoid fraudulent transactions and/or improve user confidence. Some embodiments determine total numbers of users denied access to system, and further determine percentage of users denied access to system (including percentages per category, per total number of users, per total number of users bidding, per total number of users participating in transactions, and other such percentages).

The present embodiments in some implementations can define multiple summary ratings for a single user. These multiple ratings can be defined according to the transactions being entered into, the categories for which the transaction is related, whether a user is a buyer or seller, and other similar criteria. For example, a single user can have, in some embodiments, a summary rating as a seller, a summary rating as a buyer, a summary rating for specific categories (e.g., a user can have an Auction summary rating), and other summary ratings.

Figure 9:
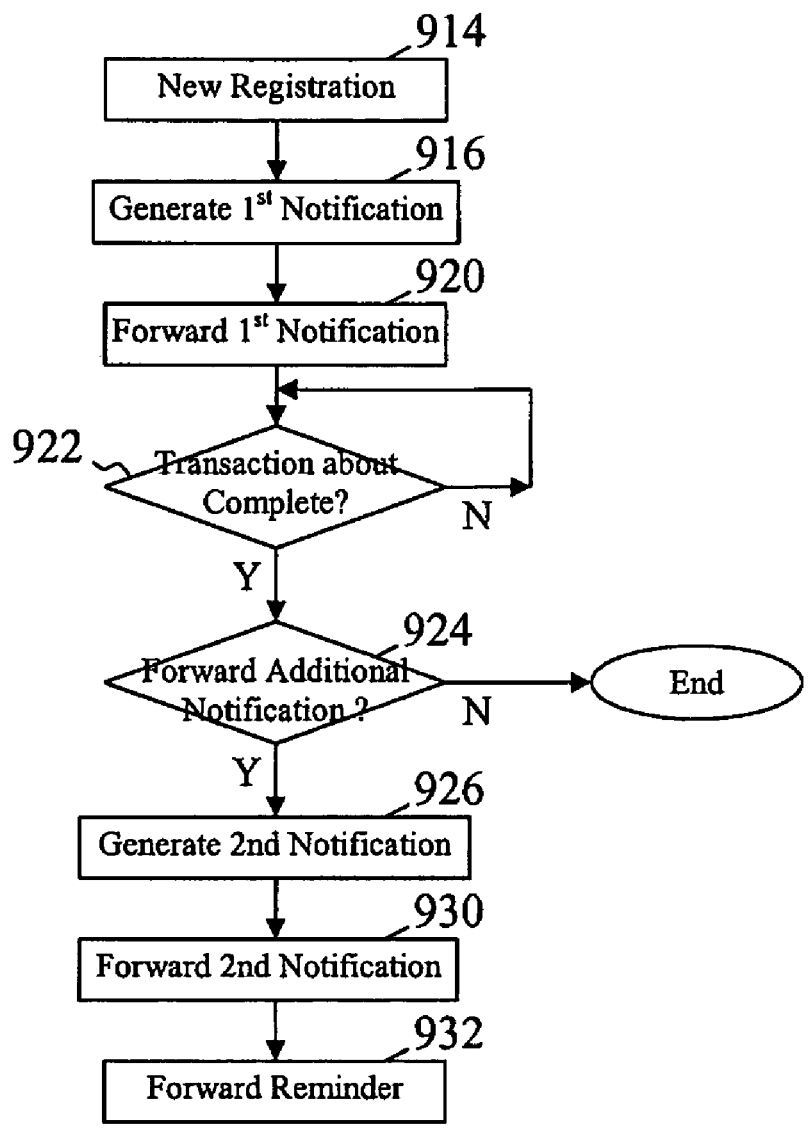
FIG. 9 depicts a simplified flow diagram of a procedure for informing users about user ratings and the issuing of notifications about users' summary ratings.

In some embodiments, a procedure is followed in an attempt to educate and inform users about user ratings and the notifications related to user ratings. FIG. 9 depicts a simplified flow diagram of a procedure 910 for informing users about user ratings and the issuing of notifications about users' summary ratings. In step 914, the system receives a new user registration. For example, a new user accesses an Internet site and registers with the system so that the user can submit bits on products being auctioned, or a new user registers in order to be able to sell products through the system. In step 916, a first message is generated informing the new user about risks in participating in transactions (e.g., transactions over the Internet). The generated message further includes information about user ratings, how the ratings are generated and the importance of reviewing other users' ratings prior to completing a transaction with other users. In some implementations, the first message can be a "Welcome" message welcoming the new user to the system that includes the information about risks and ratings.

In step 920, the generated first message is forwarded to the new user. The first message can be forwarded through substantially any relevant method, such as by e-mail, displayed on an Internet site during and/or following user registration, by regular mail (e.g., U.S. Postal Service), and other such communication methods. In some embodiments a combinations of methods are used to communicate the first message (e.g., by e-mail and regular mail).

The process 910 continue to step 922 where the process determines if a transaction is about to be completed. For example, the process determines that a winning bidder has been established. In another example, the process can identify that an agreed price has been established. In yet other embodiments, the process can be signaled when a user selects to purchase a product (e.g., the user selects a purchase option). If a transaction is about to be completed, step 924 is entered where the process determines if an additional notification about user ratings should be forwarded to one or more of the users. For example, the process can determine if one or more of the users of the subject transaction are unrated or have a summary rating that is negative. In some implementations the process utilizes the process 210 of FIG. 2.

If it is determined in step 924 that a notice is to be generated, step 926 is entered where a message identifying risk and recommending the user access summary ratings is generated. In step 930 the message is forwarded to one or more of the users entering into the transaction. In some embodiments, the message can be a Notice or Warning box that is displayed in the Internet site on the user's display (e.g., notification box 620 of FIG. 6). As discussed above, the notification box can be displayed in substantially any relevant position in the display.

Some embodiments of the process 910 further include step 932 where a rating reminder or follow-up message is forwarded after a transaction has taken place to one or more of the users that took part in a transaction. The reminder message can request the user to rate the one or more users with whom they entered into the transaction. For example, an e-mail can be forwarded to a first user that bought a product from a second user. The e-mail message can request the first user to rate the second user (e.g., was the purchased product(s) received, was the product damaged, and other such criteria). Similarly, an e-mail can be forwarded to the second user requesting the second user rate the first user (did the first user receive payment, was the payment accurate, and other such criteria).

These reminder messages can be generated at substantially any period of time following the transaction. For example, the reminder message to a selling user can be sent seven (7) days after the transaction, by which time the seller should be aware whether payment was received. Similarly, the reminder message to a buying user can be sent thirty (30)

days after the transaction, by which time the buying user should have received the purchased product and the condition of the product.

The notification to users can, in some embodiments, be different for different users. In some implementations, a seller notification can be displayed on an Internet site being viewed by the selling user that has information relevant to a buying user. Similarly, a buyer notification can be displayed on an Internet site being viewed by the buying user that has information relevant to a seller user. Additionally and/or alternatively, the notifications can be notification boxes displayed, and the buying user notification can be positioned in a buyer Internet site in a first position, and the selling user notification can be positioned in a seller Internet site in a second position. Further, different notifications can be forwarded depending on the types (Good, Bad, Neutral) of users, the kinds of transactions, the categories of the transactions and other factors.

Some embodiments additionally provide an exemption and/or an override to the generation and communication of notifications. For example, some selling users can be exempted from receiving notifications about reviewing a buying user's summary rating. Such selling users can include corporations, stores and other users that are aware of the risks involved in entering transactions. Additionally and/or alternatively, the process of forwarding notifications to buying users can be eliminated for certain selling users. In some implementations, the notification can be eliminated for products that are below a certain value and/or have a lower risk of fraud. Other such users can be exempted from the notification.

The present embodiments provide users with summary rating information as well as notifying users to access other user's rating information in an attempt to educate users and to avoid fraudulent transactions. Further, the notification and/or warning is provide to users early in the transaction process, for example, when user first accesses information about a product, in results from a searches, and/or at other stages in the transaction process. In some implementations, once it is determined that the notification should be displayed, the notification is displayed at each stage of the transaction.

The notifications allow users to check rating information and/or transaction history information to better weigh the risks involved in entering into transactions. Additionally, the notifications can be initiated based on a variety of factors and these factors can vary according to users, kinds of transactions, categories of transactions, and other criteria. Still further, the present embodiments provide for the collecting and tracking of metrics and/or statistics. These metrics allow the embodiments to adjust thresholds and vary evaluations in an attempt to ensure the notifications are accurate and forwarded or displayed with an optimal degree of frequency so that the notifications have meaning. The notifications provided by the present embodiment provide users with increased confidence regarding transactions, and thus will increase the number of transactions that are facilitated through the embodiments.

While the invention herein disclosed has been described by means of specific embodiments and applications thereof, numerous modifications and variations could be made thereto by those skilled in the art without departing from the scope of the invention set forth in the claims.

What is claims is:

1. A method for use in generating a user rating notice, comprising:

identifying that a first user is interested in entering into a transaction with a second user;

displaying a second user's summary rating to the first user;

determining that the second user's summary rating is less than a rating threshold; and displaying a warning box notification to the first user when the second user has a summary rating that is less than the rating threshold;

determining, when the second user's summary rating is greater than the rating threshold, that the second user has been performing transactions for less than a threshold period of time; and displaying a warning box notification to the first user when the second user has been performing transactions for less than a threshold period of time.

2. The method of claim 1, wherein the warning box notification notifies the first user to review a transaction history of the second user.

3. The method of claim 2, wherein the displayed warning box notification comprises providing access to additional information within the warning box notification.

4. The method of claim 3, wherein the generating the warning box notification comprises incorporating a link to additional information.

5. The method of claim 3, wherein the generating the warning box notification comprises incorporating recommendations to the second user.

6. The method of claim 3, wherein the generating the warning box notification comprises incorporating an advertisement.

7. The method of claim 1, further comprising: generating search results based on search criteria; and displaying the search results; wherein the displaying the warning box notification comprises displaying the warning box notification with the displaying of the search results.

8. The method of claim 1, further comprising: receiving a rating for the second user; and adjusting the second user's summary rating according to the received rating.

9. The method of claim 1, further comprising: notifying the first user when the second user's summary rating increases above a threshold.

10. A method for use in providing users with information that can be utilized in evaluating transactions, the method comprises:

determining that a first user is interested in entering into a transaction with a second user;

displaying the second user's summary rating;

determining that the second user's summary rating is less than a first threshold;

when the second user's summary rating is less than the first threshold, displaying a notification to the first user recommending the first user review the second user's summary rating information prior to the first user entering into a transaction with the second user;

determining, when the second user's summary rating is greater than the first threshold, that the second user has been performing transactions for less than a second threshold period of time;and generating and displaying the notification when the second user has been performing transactions for less than the second threshold period of time.

11. The method of claim 10, wherein the displaying of the notification to the first user is done so prior to the first user entering into the transaction with the second user when the second user's summary rating is less than the first threshold.

12. The method of claim 10, wherein the displaying the notification to the first user comprises displaying a warning box notifying the first user to review the second user's summary rating.

13. The method of claim 12, wherein the warning box further comprises recommended actions relating to the transaction.

14. The method of claim 10, further comprising: determining that the second user's summary rating is at least equal to a the first threshold; and preventing the displaying of the notification to the first user to review the second user's summary rating information prior to the first user entering into the transaction with the second user when the second user's summary rating is at least equal to the first threshold.

15. The method of claim 10, further comprising: receiving a first rating of the second user from the first user; verifying that a transaction occurred between the first and second users; and re-determining the summary rating of the second user based at least in part on the first rating.

16. The method of claim 15, further comprising: determining that the first user has submitted a previous rating of the second user; and implementing the re-determining the summary rating including re-determining the summary rating without including the previous rating when the first rating and the previous rating are from the first user.

17. The method of claim 10, further comprising: monitoring ratings of a first group of users, where each user of the first group has a summary rating that exceed a first threshold; and adjusting a value of the first threshold when a second threshold number of users of the first group have their summary ratings drop below the first threshold.

18. The method of claim 10, further comprising: determining whether the second user has participated in a threshold number of transactions; and implementing the displaying of the notification to the first user to review the second user's summary rating information prior to the first user entering into the transaction with the second user when the second user has not participated in a number of transactions that exceed the threshold number of transactions.

19. The method of claim 10, further comprising: determining when the second user is a verified user; and preventing the displaying of the notification when the second user is a verified user.

* * * * *

UNITED STATES PATENT AND TRADEMARK OFFICE
CERTIFICATE OF CORRECTION

PATENT NO. : 7,209,895 B2 Page 1 of 1
APPLICATION NO. : 10/849962
DATED : April 24, 2007
INVENTOR(S) : Kundtz et al.

It is certified that error appears in the above-identified patent and that said Letters Patent is hereby corrected as shown below:

On The Title Page Item -56- under "Other Publications", line 3, delete "[receovered" and insert -- [recovered --, therefor.

On The Title Page Item -56- under "Other Publications", line 6, delete "[receovered" and insert -- [recovered --, therefor.

On Sheet 5 of 9, in Figure 5 (Serial No. 2, Reference Numeral 514), line 2, delete "Drice," and insert -- Drive, --, therefor.

In column 2, line 30, after "threshold" insert -- . --.

In column 5, line 38, delete "idetified" and insert -- identified --, therefor.

In column 8, line 29, delete "months." and insert -- months). --, therefor.

In column 18, line 60, in Claim 10, delete "time;and" and insert -- time; and --, therefor.

In column 19, line 10, in Claim 14, after "to" delete "a".

Signed and Sealed this

Twelfth Day of June, 2007

JON W. DUDAS
*Director of the United States Patent and Trademark Office*